April 19, 1960 H. L. CARTER, JR 2,933,694

BANDWIDTH SWITCHING CIRCUITS

Filed Aug. 18, 1955 2 Sheets-Sheet 1

INVENTOR
HOWELL L. CARTER JR.
BY [signature]
ATTORNEY

April 19, 1960 H. L. CARTER, JR 2,933,694

BANDWIDTH SWITCHING CIRCUITS

Filed Aug. 18, 1955 2 Sheets-Sheet 2

INVENTOR
HOWELL L. CARTER JR.
BY Elmer J. Gorn
ATTORNEY 2,933,694
Patented Apr. 19, 1960

2,933,694

BANDWIDTH SWITCHING CIRCUITS

Howell L. Carter, Jr., Natick, Mass., assignor to Raytheon Company, a corporation of Delaware Application August 18, 1955, Serial No. 529,101
4 Claims. (Cl. 330—154)

This invention relates to the reception of radiant energy, and particularly to the control of the width of the receivable band of frequencies constituting the range of signals of intermediate frequencies that may pass through the I.F. stage of a frequency-modulated type of radiant energy receiver.

The invention provides novel means for switching the receivable signal range, or bandwidth, from one to another of a plurality of different values, which novel means utilizes only two electron discharge tubes, even for multiple selection switches, as contrasted with prior art arrangements requiring additional sets of tubes for each additional switch position.

The invention is characterized by the employment of unidirectional current-conducting devices—rectifiers, or their equivalent—in positions intermediate the bandwidth selection switch, on the one hand, and the control grid circuit of the second of two bandwidth-determining amplifier tubes, on the other, there being one such unidirectional device provided for each parallel branch circuit bridgeable by the selector switch, each branch circuit representing a distinct and different bandwidth selection setting.

The invention is further characterized by the inclusion in the selector switch assembly of an additional parallel branch serving as an automatic gain control means whereby the amplification or signal strength is appropriately adjusted simultaneously with a shift of the bandwidth from one value to another.

Figure 1:
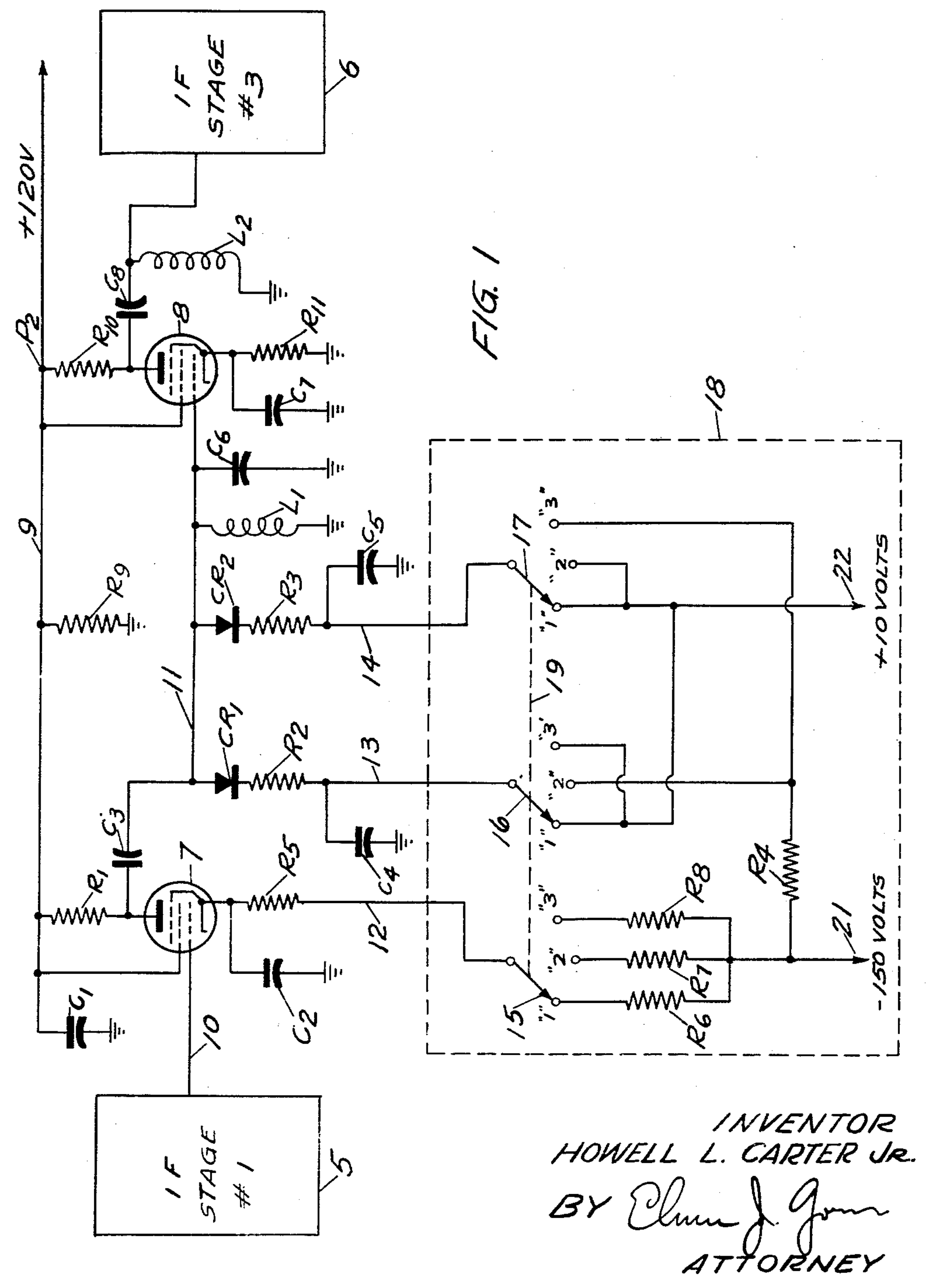
Figure 2:
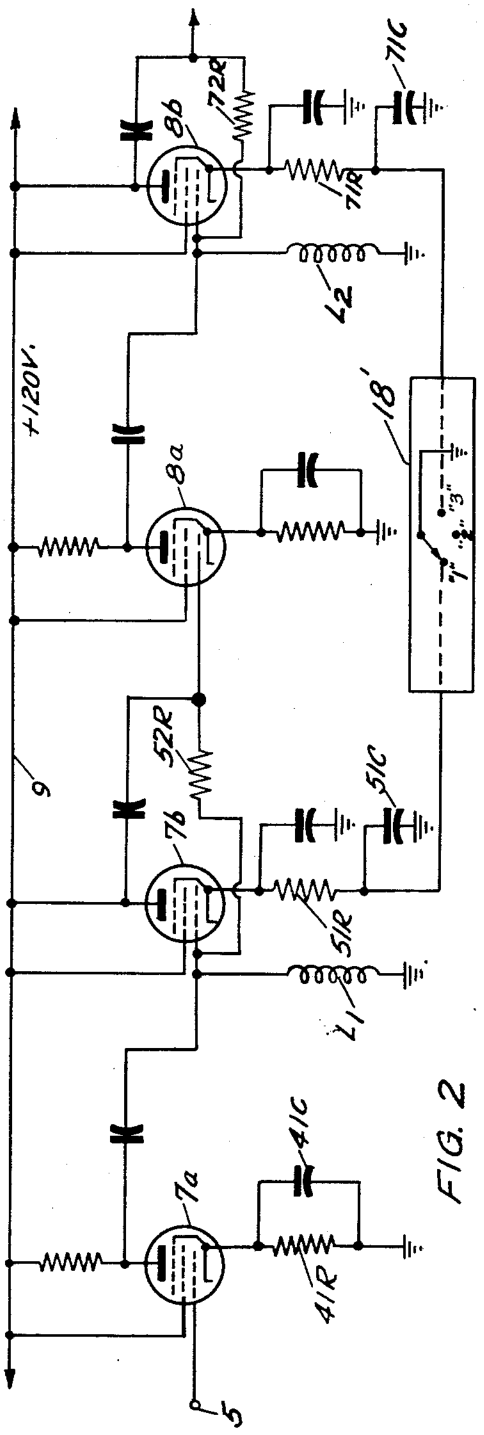
Figure 3:
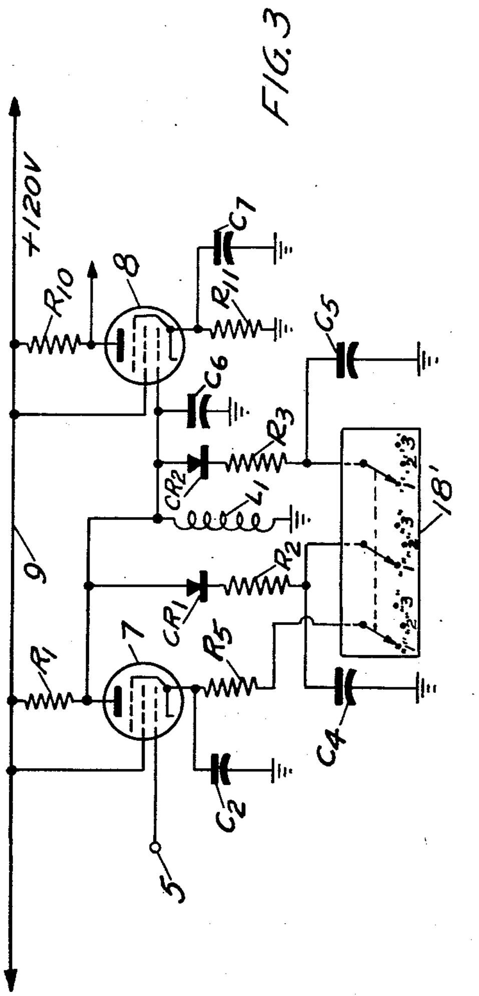

Other characteristics and potentialities of the invention will become apparent upon reference to the following description of the embodiment of the invention illustrated in the accompanying drawings wherein:

Fig. 1 is a circuit diagram indicating how the invention may be applied to the control of the receivable bandwidth of the I.F. amplification stages of a radiant energy receiver system; and Figs. 2 and 3 are comparison diagrams illustrating the difference in tube component equipment, as between the prior art arrangement (Fig. 2) and an arrangement (Fig. 3) that is made possible by the present invention.

Referring first to Fig. 1, reference numerals 5 and 6 designate the first and final sections of an I.F. amplifier assembly whose intermediate section includes a pair of pentode amplifiers 7 and 8 whose plate circuits are connected to a 120-volt power line 9, the tubes having their respective control grids connected from the preceding stages, as indicated at 10 and 11. From grid circuit 11, leads 13 and 14 connect to the movable contact arms 16 and 17, respectively, of the bandwidth switch assembly 18, which assembly includes a link 19 interconnecting arms 15, 16 and 17, so that all three arms may be shifted, in unison, to occupy corresponding positions "1", "2", or "3", as desired. Alternatively arm 15 may have independent motion.

In position "1", arm 15 is in contact with a terminal leading to a source 21 of negative potential, by way of resistance element $R_6$; and arms 16 and 17 are in contact with terminals leading to a source 22 of positive potential. In position "2", arm 15 is in contact with a terminal leading to negative source 21 by way of resistance element $R_7$; arm 16 is also in contact with a terminal leading to negative source 21; but arm 17 is still in connection with positive source 22. In position "3", arm 15 is in contact with a terminal leading to negative source 21 by way of resistor $R_8$; but arms 16 and 17 are now in reverse polarity positions, with arm 16 now connecting with source 22, and arm 17 now connecting with source 21.

With the above-described arrangement of the bandwidth control circuits, the following possibilities are present:

In position "1", the two asymmetrically conducting diodes $CR_1$ and $CR_2$ function to isolate resistors $R_2$ and $R_3$ from the grid circuit 11, by reason of the high resistance thereof to current flow in the upward direction, as viewed in Fig. 1. In this condition, therefore, the bandwidth of the I.F. circuit is controlled by the effect (upon inductance $L_1$) of the relative values of $R_1$ and $C_6$; the value $R_1$ being preferably chosen to conform to the narrowest bandwidth adjustment desired.

In position "2", diode $CR_1$ is effective as a conductor in the forward (downward) direction, while diode $CR_2$ is not. In this condition resistor $R_4$ serves to control the value of the current flow, while the bandwidth is controlled by the values of $R_1$ and $R_2$, in parallel, and $C_6$. This arrangement, therefore, will provide the desired wider bandwidth.

In position "3", diode $CR_2$ is effective as a conductor in the forward direction, while diode $CR_1$ is not. In this condition, the bandwidth is controlled by the values of $R_1$ and $R_3$, in parallel, along with $C_6$. $R_3$ will have a value differing from that of $R_2$ by an amount that is appropriate to produce the desired maximum bandwith.

Switch arm 15, in conjunction with cathode resistor $R_5$, of large value, and resistors $R_6$, $R_7$ and $R_8$, whose values vary progressively in proportion to the successively produced bandwidth variations, operates to vary the transconductance characteristic ($G_m$) of tube 7 in corresponding pattern, so that the circuit may have constant gain in all positions of the bandwidth selector switch assembly, or, alternatively, a fixed amount of gain with decreasing bandwidth, as is desirable in normal radar operations.

To accomplish bandwidth switching of comparable versatility (three different settings) by the prior art "feedback" method, it has been necessary to employ four amplifying tubes (as indicated at 7*a*, 7*b*, 8*a*, and 8*b* in Fig. 2) whereas the present invention makes it possible to reduce the number of tubes to two, namely, the tubes 7 and 8 (Figs. 1 and 3). For additional selective settings, under the prior art arrangement exemplified in Fig. 2, it was necessary to add two tubes for each additional bandwidth selection means. With the use of the procedure herein disclosed, on the other hand, the single pair of tubes 7 and 8 can function for any desired number of bandwidth selection settings, the additional positions for the selector 18 requiring only the addition of one more unidirectional branch for each added switch position, to supplement the unidirectional branches shown at $CR_1$—$R_2$ and $CR_2$—$R_3$ in Figs. 1 and 3.

The selector 18' of Fig. 2, which is representative of a prior art type of bandwidth selector, has a single movable arm adapted to occupy a selected one of three positions; position "1" being connected to the cathode follower circuit whose resistance 51R and capacitance 51C coact with feedback resistor 52R to control the conducting pattern of tube 7*b*, and, hence, the bandwidth prevailing when the selector switch is in position "1." Likewise, position "3" is connected to cathode follower circuit whose resistance 71R and capacitance 71C coact with feedback resistor 72R to control the conducting pattern of tube 8b, and, hence, the bandwidth prevailing when the selector switch is in position "3." Position "2" is isolated from both the cathode follower circuits above described; hence, when the selector is in position "2," there prevails a different bandwidth adjustment, intermediate the "1" and "3" widths. If a fourth bandwidth selection is desired (with the Fig. 2 "prior art" system), two additional tubes would be required, the formula being:

$$N=2+2(n-2)$$

wherein "N" represents the number of tubes required and "$n$," the number of bandwidth selection possibilities. With the system of the present invention, on the other hand, the number of tubes required does not vary; two tubes will suffice, regardless of the number of switch settings provided.

This completes the description of the embodiment of the invention illustrated herein. However, many modifications and advantages thereof will be apparent to persons skilled in the art, without departing from the spirit and scope of this invention. Accordingly, it is desired that this invention not be limited to the particular details of the embodiment disclosed herein, except as defined by the appended claims.

What is claimed is:

1. In a radiant energy receiving system including an intermediate frequency amplification stage comprising a plurality of electronic amplifying devices having output and input electrodes, said stage being tuned to a center frequency whose side band reception range is adjustable, the combination with said intermediate frequency stage of switch means and asymmetrically conductive means interposed between said switch means and the input electrodes of one of said devices of said intermediate frequency stage, means including potential sources of opposite polarity for selective association with said asymmetrically conductive means in accordance with the setting selected for said switch means, whereby resistance means are selectively connected across a parallel resonant circuit connected to said devices for controllably changing the bandwidth of said system, and means for maintaining the gain of said system substantially constant as said bandwidth is changed.

2. In a radiant energy receiving system including an intermediate frequency amplification stage comprising a plurality of electronic amplifying devices having output and input electrodes, the combination with said intermediate frequency stage of manually operable switch means for selectively connecting resistance means across a parallel resonant circuit connected to said devices whereby the receivable bandwidth characteristic of said intermediate frequency stage is changed, and a plurality of asymmetrically conductive circuits connecting said switch means with the input electrodes of one of said devices of said intermediate frequency stage, the number of such asymmetrically conductive circuits being one less than the number of operative settings into which said switch means may be positioned, and means for maintaining the gain of said system substantially constant as said bandwidth is changed.

3. In a multiple stage amplifier having a plurality of electron discharge tubes connected in sequence, with the plate of a first tube connected to the control grid of a second tube by way of a grid supply circuit which includes a parallel resonant circuit, the combination with said grid supply circuit of a pair of asymmetrically conducting circuits branching therefrom, manually operable switch means connected to said asymmetrically conducting circuits, means including potential sources of opposite polarity for rendering said asymmetrically conducting circuits alternately effective to connect resistance means across said parallel resonant circuit whereby the bandwidth of said system is controllably changed, and means for maintaining the gain of said system substantially constant as said bandwidth is changed.

4. In a multiple stage amplifier having a plurality of electron discharge tubes connected in sequence, with the plate of a first tube connected to the control grid of a second tube by way of a grid supply circuit, the combination with said grid supply circuit of frequency controlling means connected thereto, said frequency controlling means including an inductance element and a pair of asymmetrically conducting circuits connected thereto, manually operable switch means connected to said asymmetrically conducting circuits for rendering said asymmetrically conducting circuits alternately effective to connect resistance means across said frequency controlling means whereby the bandwidth of said system is controllably changed, and means for maintaining the gain of said system substantially constant as said bandwidth is changed.

References Cited in the file of this patent

UNITED STATES PATENTS

| | | |
|---|---|---|
| 2,388,590 | Zappacosta | Nov. 6, 1945 |
| 2,476,066 | Rochester | July 12, 1949 |
| 2,509,062 | Horner | May 23, 1950 |
| 2,535,303 | Lewis | Dec. 26, 1950 |

FOREIGN PATENTS

| | | |
|---|---|---|
| 675,562 | Great Britain | July 16, 1952 |